Figure 1:
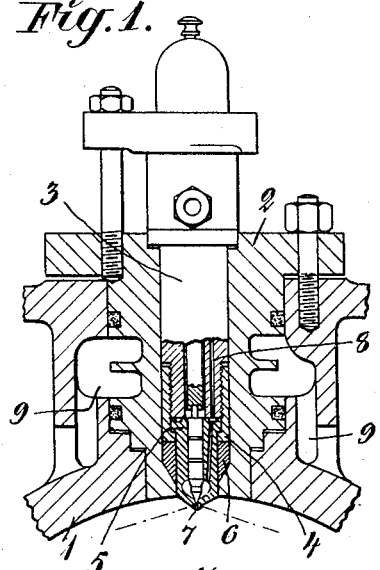

Oct. 10, 1939. E. O. P. THEGE 2,175,450

INTERNAL COMBUSTION ENGINE

Filed Aug. 13, 1936

Patented Oct. 10, 1939

2,175,450

UNITED STATES PATENT OFFICE 2,175,450

INTERNAL COMBUSTION ENGINE

Edvin Ossian Parcival Thege, Stockholm, Sweden, assignor to Aktiebolaget Atlas Diesel, Sickla, Stockholm, Sweden, a corporation of Sweden Application August 13, 1936, Serial No. 95,768
In Sweden August 28, 1935

6 Claims. (Cl. 123—32)

In internal combustion engines in which the fuel is directly injected it is of supreme importance, especially when using thick and heavy fuel-oils, that the injection nozzles in the combustion chamber are kept well cooled so that the small holes through which the fuel is injected do not become stopped-up with coke or the like.

With this end in view, good results have been obtained by cooling the injection nozzle or atomizer itself with water. However, this method involves the use of very complicated and expensive devices, in addition to which complications easily arise as a result of the difficulty of attaining perfect tightening and of stoppages in the service-pipes.

The object of the present invention is to attain adequate cooling of the injection nozzle or atomizer without cooling it directly with water, thus avoiding the disadvantages of such cooling. This is achieved in such a manner that the parts which surround the injection nozzle or atomizer are cooled and that, between the mantle surface of the casing of the atomizer aggregate and the surrounding cooled parts, a sleeve of soft metal is pressed, serving both as a packing and as a conductor of heat from the atomizer aggregate to the cooled parts surrounding it. This method gives a simple and inexpensive device which is nevertheless very effective.

The atomizer used may be of any known type and may suitably be constructed in one piece with guides for the injection valve. It should preferably be constructed with the smallest possible dimensions. It has hitherto been customary to press this aggregate of atomizer and valve-box against a flat seat, the necessary packing being effected in the usual manner by means of an ordinary flat packing ring placed between the flat seat and the valve-box. For the purposes of the present invention the atomizer aggregate inclusive of injection valve, if such is employed in the aggregate, may conveniently be referred to generically as a fuel injector.

According to the present invention, this flat packing ring is replaced by a cylindrical or conical packing-sleeve of soft metal, placed between the mantle surface of the atomizer-aggregate and the parts surrounding the latter, these parts being adapted to be cooled with water or other suitable cooling medium. By this means, in addition to the necessary packing, an effective conduction of heat from the atomizer and injection valve aggregate to the surrounding cooled parts is attained. When the atomizer and valve aggregate are fitted, the sleeve of soft metal is so arranged that it is pressed outwards against the surrounding cylinder-cover or casing and inwards against the corresponding portion of the atomizer and valve-aggregate, which may be either cylindrical or conical. In this manner, the sleeve of soft metal is caused to bear closely on both the atomizer aggregate and the surrounding, cooled parts. With this end in view, the valve-box and the corresponding surface of the surrounding cooled parts may suitably be constructed so that they taper slightly towards the lower end so that, when the device is fitted together, a wedging effect is obtained which effectively presses the soft metal sleeve against both sides, thus increasing its capacity to conduct heat. This is, however, not essential since it is possible to achieve the necessary pressure outward and inwards with a cylindrical valve-box if the sleeve is made of a suitable soft metal. Thus according to the present invention, both the upper and the lower bearing-surfaces of the soft metal sleeve may be either flat or conical or the upper surface may be flat and only the lower one conical. The conical surfaces are very suitable according to the present invention because, by this means, the sleeve of soft metal is very effectively pressed inwards against the valve box so that the resistance to the conduction of heat between the valve-box and the sleeve is considerably reduced whereby a more effective cooling is attained.

If the bearing-surfaces between the soft metal sleeve and the surrounding parts are made sufficiently large, effective and direct conduction of heat from the atomizer to the cooled parts is attained according to the present invention.

Some forms of construction according to the present invention are shown in the attached drawing.

Fig. 1 shows a vertical section through the injection aggregate and surrounding parts according to a form of construction of the invention. Figures 2, 3, 4, 5 and 6 show other forms of construction according to the invention.

In all the figures, the cylinder head is indicated by 1. In Fig. 1, 2 is a casing which surrounds the valve and atomizer aggregate and which is constructed for water-cooling. The valve-aggregate is indicated by 3 and, within it, the valve-box 5 and the atomizer 7 (in one piece) are held fast by means of the clamping collar 4 (Fig. 1). The heat-conducting packing sleeve of soft metal is indicated by 6. The fuel is conveyed in the known manner through the duct 8 (Fig. 1). The ducts for the cooling water in the jacket 2 and the cover 1 are indicated by 9.

As the figures show, when the atomizer and valve aggregate 3 is inserted and pressed down, the sleeve 6 of soft metal will be pressed by the clamping collar 4 both outwards against the surrounding, cooled casing 2 and inwards against the valve-box, so that the heat in the atomizer and the valve will be conducted to the cooled parts much more effectively than if an ordinary flat packing ring had been used since the latter is usually made of a substance which conducts heat very badly as compared with metals, and, in addition, has comparatively small heat-conducting surfaces.

Figure 2:
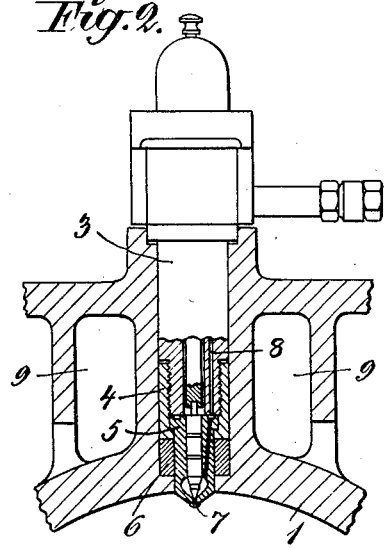
Figure 3:
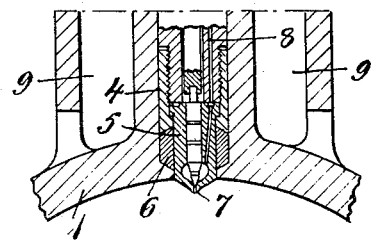
Figure 4:
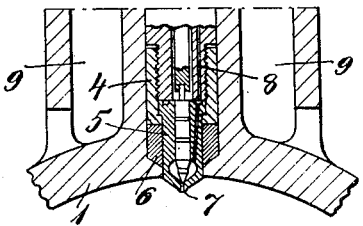

In Fig. 1, the lower bearing surface of the sleeve 6 and the corresponding seat for it in the casing 2 are conical. Fig. 2 shows how a sleeve 6 of soft metal with flat bearing surfaces can be arranged on a correspondingly constructed seat in the cover itself, which is, in this case, water-cooled. Figs. 3 and 4 show a form of construction of such a sleeve either with both bearing surfaces conical (Fig. 3) or with only the lower one bevelled (Fig. 4).

Figure 5:
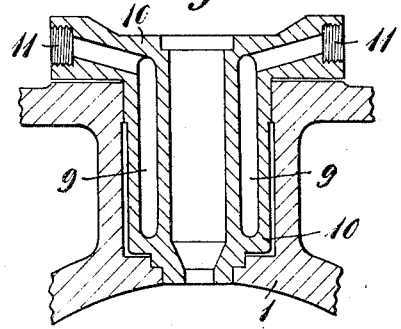
Figure 6:
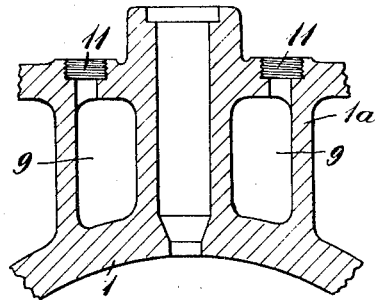

Figs. 5 and 6 show various methods of arranging the cooling ducts, the atomizer and valve-aggregate not being fitted. According to Fig. 5 a casing 10, which has in this instance an independent cooling duct 9, is fitted between the valve-aggregate and the cylinder head 1, which is in this instance not cooled. The inlets and outlets of the cooling ducts 9 are indicated by 11. As the cylinder head is not cooled, it may suitably be constructed of an aluminium alloy, for example.

According to Fig. 5, the casing 10 may be made of a metal with a high capacity for the conduction of heat, for example, an alloy of copper, nickel, aluminium. According to Fig. 6 the cover 1 is cooled, the duct 9 being arranged in the upper part 1—a of the same, said part directly enclosing the atomizer and valve-aggregate.

It will be observed that in all of the modifications illustrated, the part in which the fuel injector seats, is provided with a differential bore, the portion of which of smaller diameter is located at the inner end. The inner end of the injector fits this smaller bore so that the flange below the shoulder between the portions of the bore of different diameter forms an effective shield for protecting the packing ring as well as a support for the lower end of the packing ring which seats against the shoulder.

Other modifications are also possible within the scope of the invention.

I claim:

1. In an engine having a combustion chamber, a fuel injector opening into said chamber, cooled wall structure around said injector and a ring of soft metal having relatively high heat conductivity between the injector and the wall structure, a portion of said wall structure extending between said ring and said chamber and contacting said injector to shield the ring from combustion chamber temperature, and means for causing the ring to be pressed between the injector and the cooled wall structure whereby to cause the ring to serve as a packing means and as a heat transmitting medium for rapidly conducting heat from the injector to the cooled wall structure.

2. In an engine having a combustion chamber, a fuel injector opening into said chamber, cooled wall structure around said injector and a ring of soft metal having relatively high heat conductivity between the injector and wall structure, said injector passing through said ring and engaging a portion of the wall structure extending between the ring and the chamber to shield the ring from combustion chamber temperature, and means for causing the ring to be pressed between the injector and the cooled wall structure whereby to cause the ring to serve as a packing means and as a heat transmitting medium for rapidly conducting heat from the injector to the cooled wall structure.

3. In an internal combustion engine, a fuel injector, cooled wall structure around said injector and a sleeve of soft metal having relatively high heat conductivity around the injector, a portion of said wall structure forming a flange providing a support for the inner end of said sleeve, said portion engaging the inner end of said injector to provide a shield for protecting said ring from exposure to combustion chamber temperatures, and means associated with said injector for engaging the outer end of said sleeve to compress it against said support and force it laterally into contact with the injector and the wall structure around the injector, whereby to cause said sleeve to provide packing between the injector and the wall structure and to provide a path for rapid heat conduction from the injector to the wall structure.

4. In an engine having a combustion chamber, a fuel injector opening into said chamber, a cooled wall structure around said injector and a body of soft metal having a relatively high heat conductivity arranged between the injector and the wall structure, a portion of said wall structure extending between said body of metal and said chamber and in contact with the inner portion of said injector to shield said body of metal from combustion chamber temperature, and means for confining said body of metal between the injector and the cooled wall structure, in contact with both, whereby said body of metal serves as a packing means and as a heat transmitting medium for rapidly conducting heat from the injector to the cooled wall structure.

5. In an engine having a combustion chamber, a fuel injector opening into said chamber, cooled wall structure in heat exchange relation with said injector and a body of soft metal having a relatively high heat conductivity arranged between the injector and the wall structure, a portion of said wall structure extending between said body of metal and said chamber to provide a gas tight shield for protecting said body of metal from combustion chamber temperature, and means for confining said body of metal between the injector and the cooled wall structure, in contact with both, whereby said body of metal serves as a heat transmitting medium for rapidly conducting heat from the injector to the cooled wall structure.

6. In an internal combustion engine having a combustion chamber, a fuel injector, cooled wall structure around said injector and a body of readily distortable metal having relatively high heat conductivity extending entirely around the injector, a portion of said wall structure being disposed between said body of metal and said combustion chamber and contacting the inner end of said injector to shield said body of metal from combustion chamber temperature, said body of metal being confined between the injector and the cooled wall structure and in contact with both to provide a heat transmitting medium for rapidly conducting heat from the injector to the cooled wall structure.

EDVIN OSSIAN PARCIVAL THEGE.